United States Patent
Rynningen

(10) Patent No.: US 6,467,548 B1
(45) Date of Patent: Oct. 22, 2002

(54) MULTI-SIZABLE HORSESHOE

(76) Inventor: Hans K. Rynningen, 1562 E. Main St., #177, El Cajon, CA (US) 92021

(*) Notice: Subject to any disclaimer, the term of this patent is extended or adjusted under 35 U.S.C. 154(b) by 0 days.

(21) Appl. No.: 09/677,233

(22) Filed: Oct. 2, 2000

Related U.S. Application Data

(63) Continuation-in-part of application No. 09/274,956, filed on Feb. 10, 1999, now Pat. No. 6,237,160.

(51) Int. Cl.[7] .................................................. A01L 1/00
(52) U.S. Cl. ............................................................ 168/4
(58) Field of Search ............................... 168/4, DIG. 1, 168/11, 12, 13, 14, 24

(56) References Cited

U.S. PATENT DOCUMENTS

| | | | |
|---|---|---|---|
| 3,628,608 A | * 12/1971 | Sherman | |
| 4,513,824 A | * 4/1985 | Ford | 168/4 |
| 4,690,222 A | * 9/1987 | Cameron | 168/4 |
| 4,892,150 A | * 1/1990 | Thoman | 168/4 |
| 5,566,765 A | * 10/1996 | Ovnicek | 168/4 |

* cited by examiner

Primary Examiner—Thomas Price
(74) Attorney, Agent, or Firm—Charles C. Logan, II

(57) ABSTRACT

A multi-sizable horseshoe made of flexible synthetic material whose heel members may be spread apart thereby enlarging the size of the horseshoe so that it can have multiple size dimensions thereby allowing a single horseshoe to fit all different sizes of horse's hoofs. The outer edge of the body member has a downwardly extending outer gripping edge. The outer edge of the body member has an outside rim extending upwardly that mates with the sides of a horse's hoof. A plurality of protrusions extend upwardly from the top surface of the body member at spaced intervals to space the bottom surface of a horse's hoof from the top surface of the body member. A plurality of bore holes pass from the bottom surface of the body member through to its top surface and glue is injected into the chamber between the horse's hoof and the top surface of the body member.

13 Claims, 4 Drawing Sheets

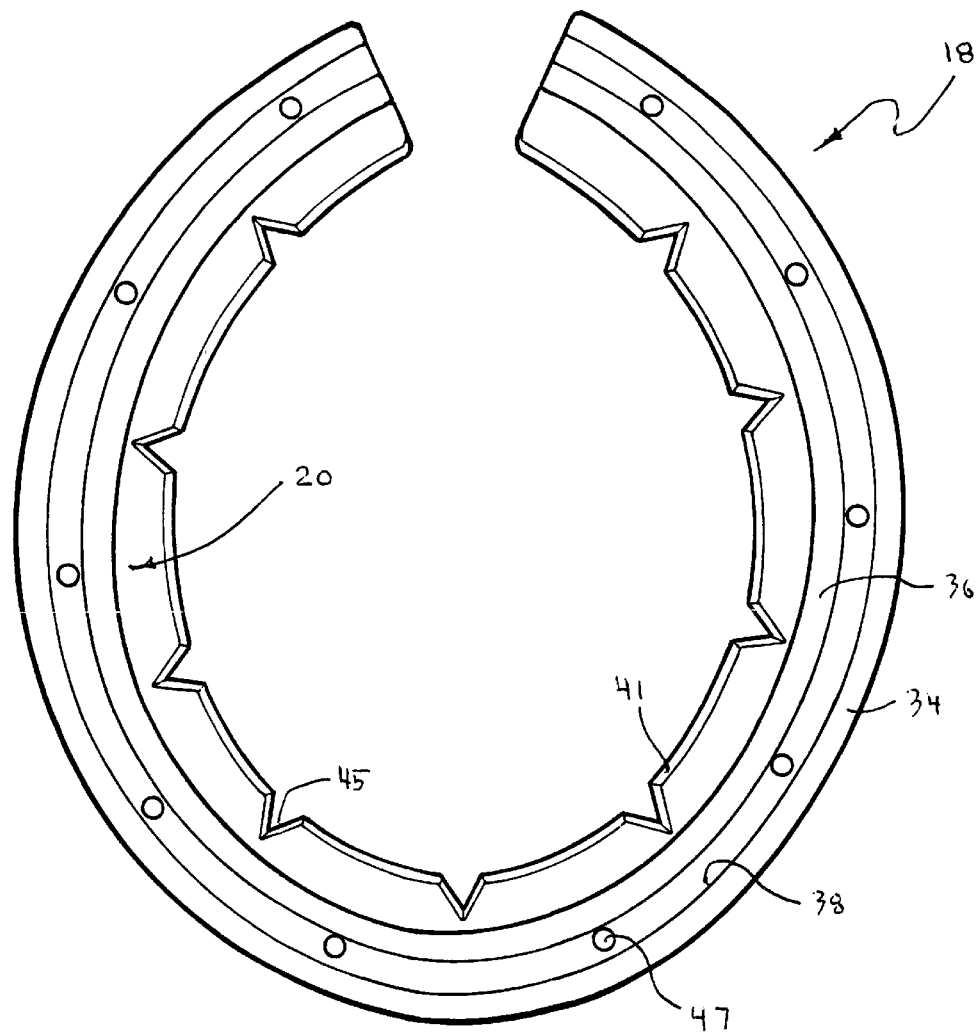
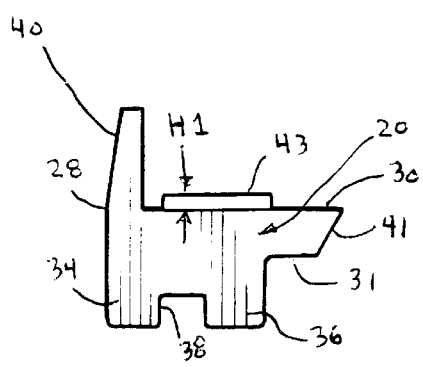
FIG. 3
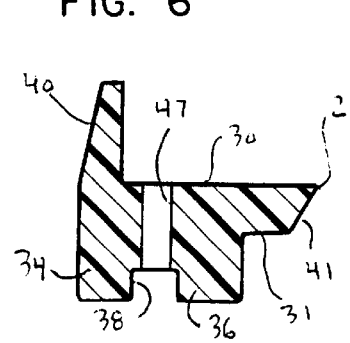
FIG. 4
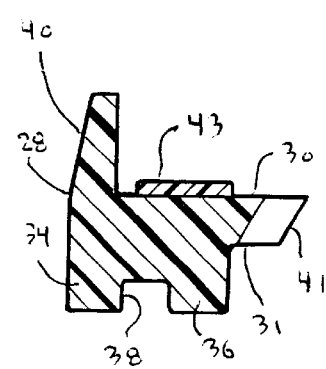
FIG. 5
FIG. 6

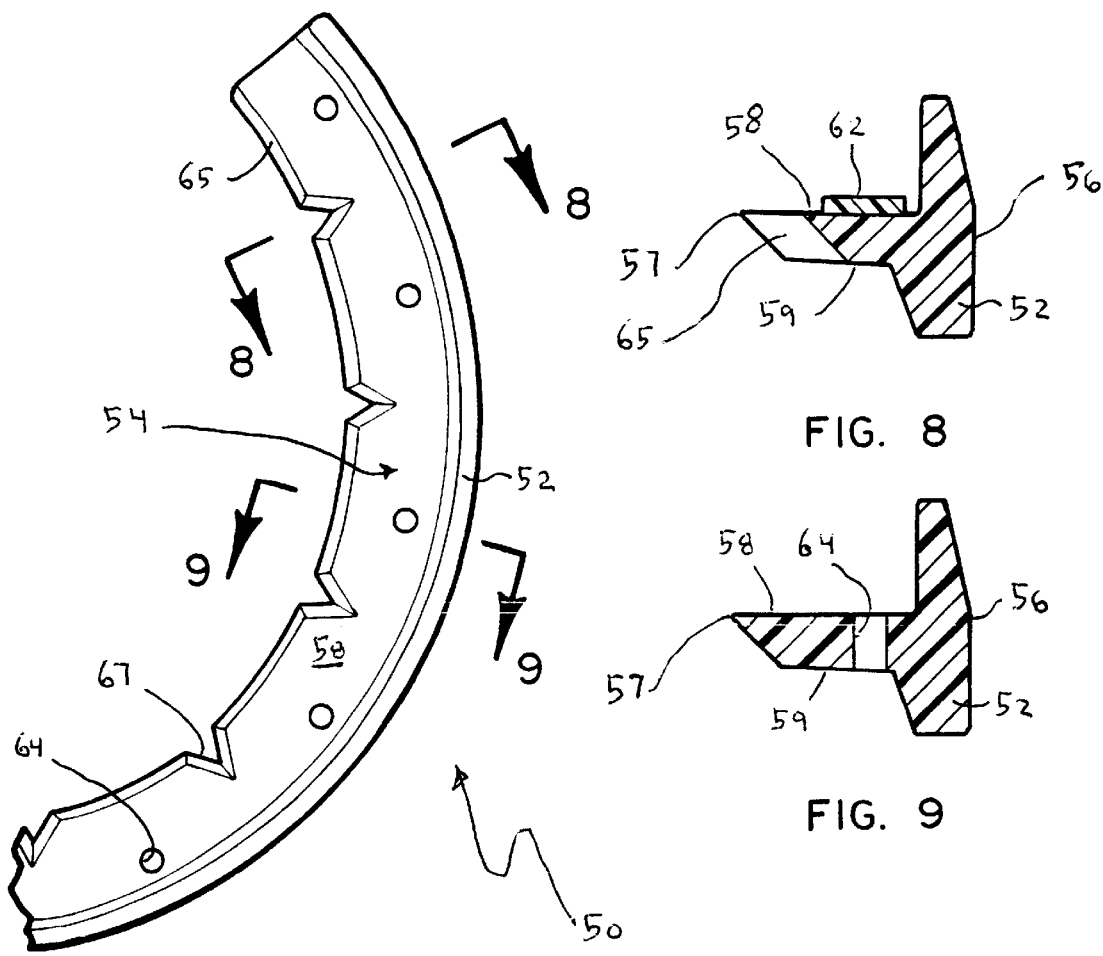
FIG. 8
FIG. 9
FIG. 7
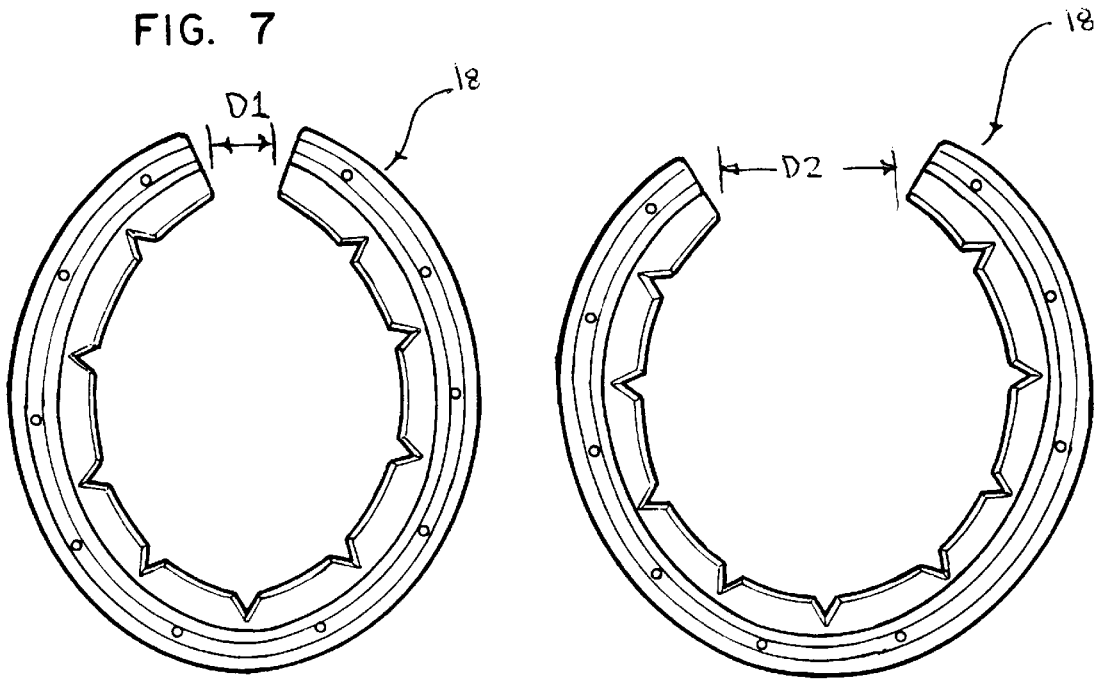
FIG. 10
FIG. 11

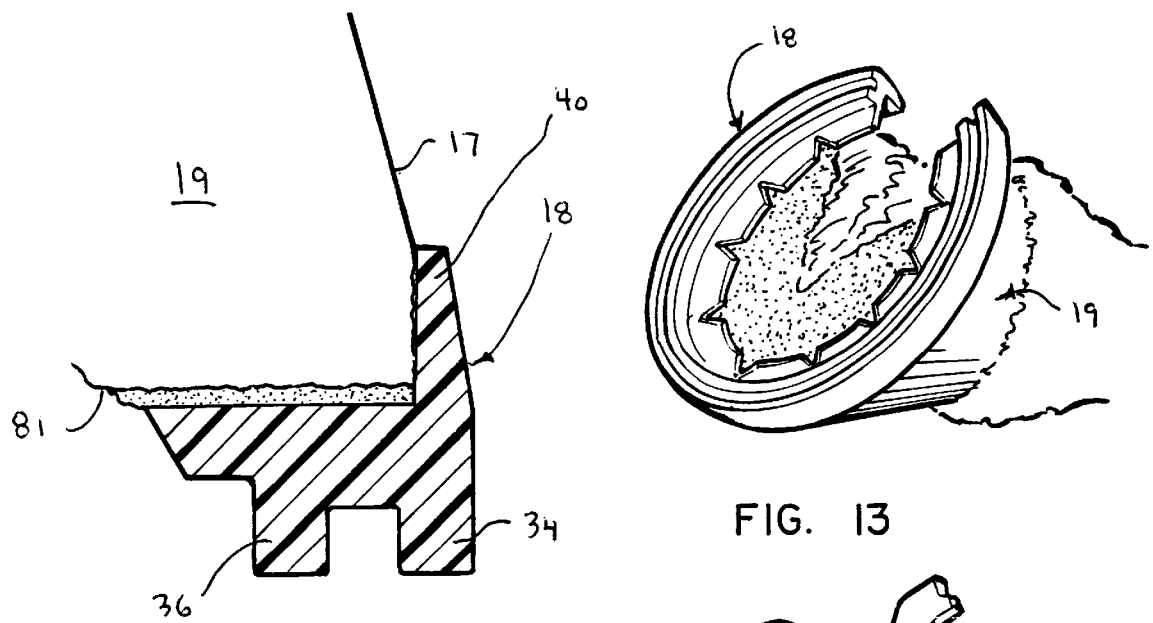
FIG. 12
FIG. 13
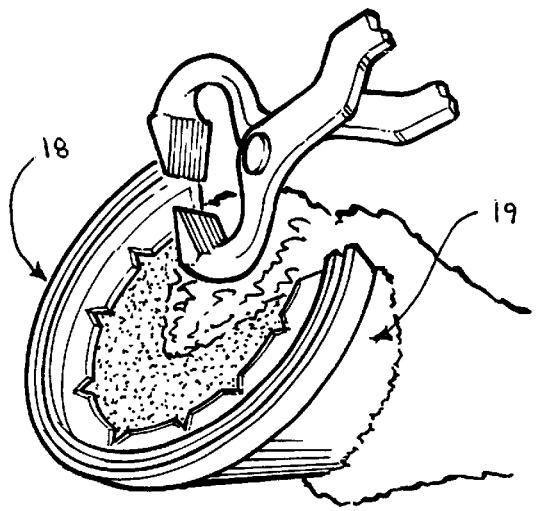
FIG. 14
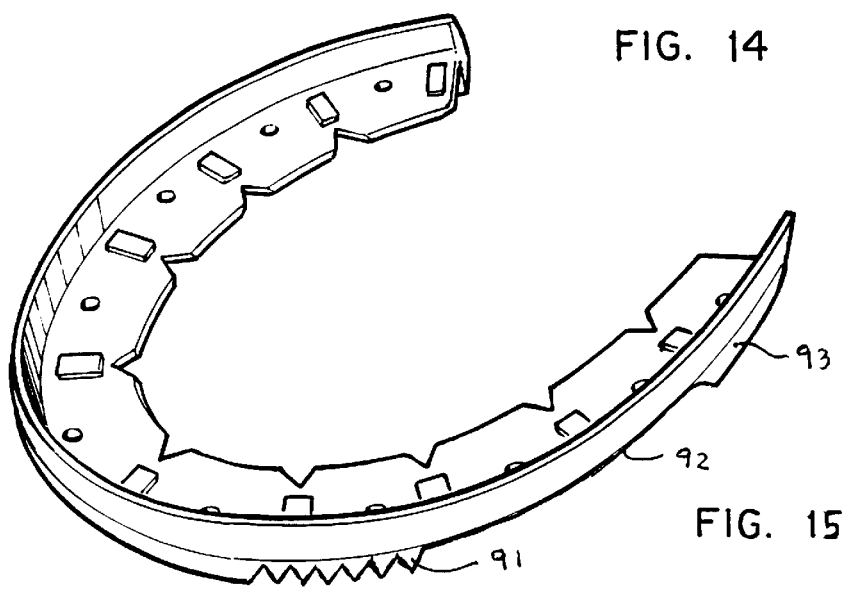
FIG. 15

MULTI-SIZABLE HORSESHOE

This application is a continuation-in-part (CIP) of application Ser. No. 09/274,956, filed Feb. 10, 1999, now U.S. Pat. No. 6,237,160.

BACKGROUND OF THE INVENTION

The invention relates to horses and more specifically to horseshoes that protect the underside of the horses hoofs, during recreational or professional riding.

In the past most horseshoes were made of metal and required nails or screws for them to be attached to the hoof of a horse.

It is known in the prior art that a synthetic horseshoe can be glued or nailed to the hoof of a horse to keep it in its proper position. This is shown in U.S. Pat. Nos. 3,310,115; 3,513,915; 3,519,079; 4,690,222; and 5,213,163. All of these patents require the proper sized horseshoe to obtain a correct fit. Also the bottom edge of the horseshoes of these patents do not have a bottom edge that can be customized, in a simple manner to suit the individual horse, conditions, rider or purpose of the ride.

The horseshoe shown in U.S. Pat. No. 3,310,115 requires that special tools be used before the shoe is attached and then to actually attach it to the hoof. Special tools are generally required to get the grooves cut on the outside edge of the horse's hoof that have to be complimentary and aligned with the shoe for correct attachment.

The horseshoe shown in U.S. Pat. No. 3,513,915 requires nails to be inserted in nail openings to attach the shoe to the hoof of the horse. In this patent, both the pad and gripping member edge of the synthetic shoe, have been impregnated with a plurality of uniformly and closely spaced metal fragments.

The horseshoe shown is U.S. Pat. No. 4,690,222 has a hard inner member that makes it very difficult to shape and be configured to the hoof. The horseshoe is rigid and does not allow for complete and unrestricted movement (expansion and contraction) of the hoof, which is the natural shock absorber for the horse.

It is an object of the invention to provide a novel multi-sizable horseshoe that can be fitted to horses having various sized hoofs.

It is also an object of the invention to provide a novel horseshoe having a gripping edge along the complete outside bottom edge of the horseshoe that can be easily customized to compensate to the requirements of the surface, weather, or individual rider. This modification can be accomplished simply by using the farrier tools(nipper and rasp), and gripping the edge, which can then be shaped from a flat to a deep cut, sharp angle, toe grab or heel grab, deep toe, short heel, or vise versa. The options are numerous and therefore can be performed to fit conditions and the individual.

It is another object of the invention to provide a novel multi-sizable horseshoe that is made of synthetic material that acts like a shock absorber for the hoof and foot by expanding and contracting, when the hoof makes contact with the ground surface.

It is an additional object of the invention to provide a novel multi-sizable horseshoe having a plurality of protrusions formed on the top surface of a horseshoe-shaped body member that contact the bottom surface of a horse's hoof thereby providing a chamber between the bottom surface of a horse's hoof and the top surface of the body member for receiving glue injected therein for bonding the horseshoe to the bottom of the horse's hoof.

It is a further object of the invention to provide a novel method of applying a synthetic material horseshoe to the bottom surface of a horse's hoof.

It is an object of the invention to provide a novel multi-sizable horseshoe that is economical to manufacture and market.

It is another object of the invention to provide a novel multi-sizable horseshoe: that is easily and quickly attached to a horse's hoof.

It is an additional object of the invention to provide a novel multi-sizable horseshoe that is made of lightweight material.

SUMMARY OF THE INVENTION

The multi-sizable horseshoe has been designed to allow a single horseshoe to fit all different sizes of horse hoofs. The horseshoe itself is made of a flexible synthetic material, such as urethane having a horizontally oriented horseshoe-shaped body member. The body member has an outer edge, an inner edge, a top surface and a bottom surface. An outer gripping edge extends downwardly from the outer edge of the body member. An outside rim extends upwardly from the outer edge of the body member. A plurality of spaced protrusions extend upwardly from the top surface of the body member. An inner gripping edge or flange extends downwardly from the bottom surface of the body member. A plurality of bore holes extend upwardly from the bottom surface of the body member to its top surface.

The horseshoe body member is purposefully formed with its laterally spaced heel members initially spaced fairly close together. This allows the single horseshoe to be fit to horses having many different sized hoofs. Any excess length of the heel members that extends over the end of the bottom surface of the horse's hoof area is easily trimmed by a farrier with his nipper or cutting tools.

The protrusions keep the bottom surface of the hoof spaced upwardly from the top surface of the horseshoe-shaped body member a predetermined height to form a chamber or cavity therebetween. This chamber is filled with a rapid setting glue made of a material such as urethane to adhere the horseshoe to the bottom of the surface of the horse's hoof. The process in which the horseshoe is bonded to the bottom of the horse's hoof will now be described.

Initially a drop of an instant glue, such as an acrylic glue, is applied to the top surface of each of the laterally spaced protrusions. The horseshoe is then placed in contact with the bottom surface of the horse's hoof causing the instant glue to form an initial bond that occurs in less than 30 seconds. This initial bond allows the farrier to then take the required time in which to inject a second rapid setting glue upwardly through each of the respective bore holes until the chamber between the top surface of the body member and the bottom surface of the horse's hoof are completely filled. Once this occurs, excess glue will also travel up the inside surface of the outside rim and against the outside surface of the horse's hoof. Inwardly extending protrusions may also be formed on the inner surfaces of the outside rim to allow more glue to adhere to the outside surface of the horse's hoof. Additional overflow glue will spread inwardly over the beveled inner edge of the body member and also the laterally spaced notches to form additional interlocking structure for the horseshoe to the horse's hoof. In some instances the farrier will drill holes upwardly through the bore holes into the bottom of the horse's hoof about ¼ inch. The glue that has been injected into each of the chambers will also fill the holes in the bottom of the horse's hoof and form glue nails. These nails are often known as liquid nails.

DESCRIPTION OF THE DRAWINGS

FIG. 3 is an end elevation view taken along lines 3—3 of FIG. 2;

FIG. 4 is a cross-sectional view taken along lines 4—4 of FIG. 2;

FIG. 5 is a cross-sectional view taken along lines 5—5 of FIG. 2;

FIG. 6 is bottom plan view the multi-sizable horseshoe shown in FIG. 2 showing it in substantially its actual size;

FIG. 7 is a partial bottom plan view of an alternative embodiment of the multi-sizable horseshoe;

FIG. 8 is a cross-sectional taken along lines 8—8 of FIG. 7;

FIG. 9 is a cross-sectional view taken along lines 9—9 of FIG. 7;

FIG. 10 is a schematic top plan view of the multi-sizable horseshoe in its static state;

FIG. 11 is a schematic top plan view of the multi-sizable horseshoe showing it having its heel members stretched apart;

FIG. 12 is a partial vertical cross-section view showing the horseshoe attached to the bottom of a horse's hoof;

FIG. 13 is perspective view showing the horseshoe after it has been initially glued to the bottom of a horse's hoof;

FIG. 14 is a perspective view show the heel portions of the horseshoe being trimmed to fit the size of the horse's hoof.

FIG. 15 is a partial front perspective view showing the manner in which the outer gripping edge of the horseshoe can be customized either before or after attachment.

DESCRIPTION OF THE PREFERRED EMBODIMENT

Figure 1:
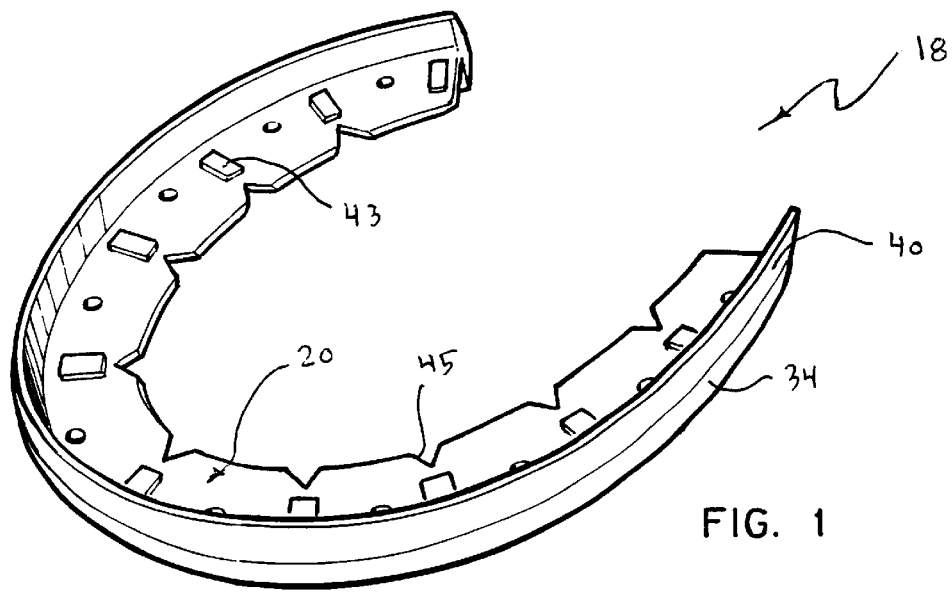
FIG. 1 is a front perspective view of a multi-sizable horseshoe.
Figure 2:
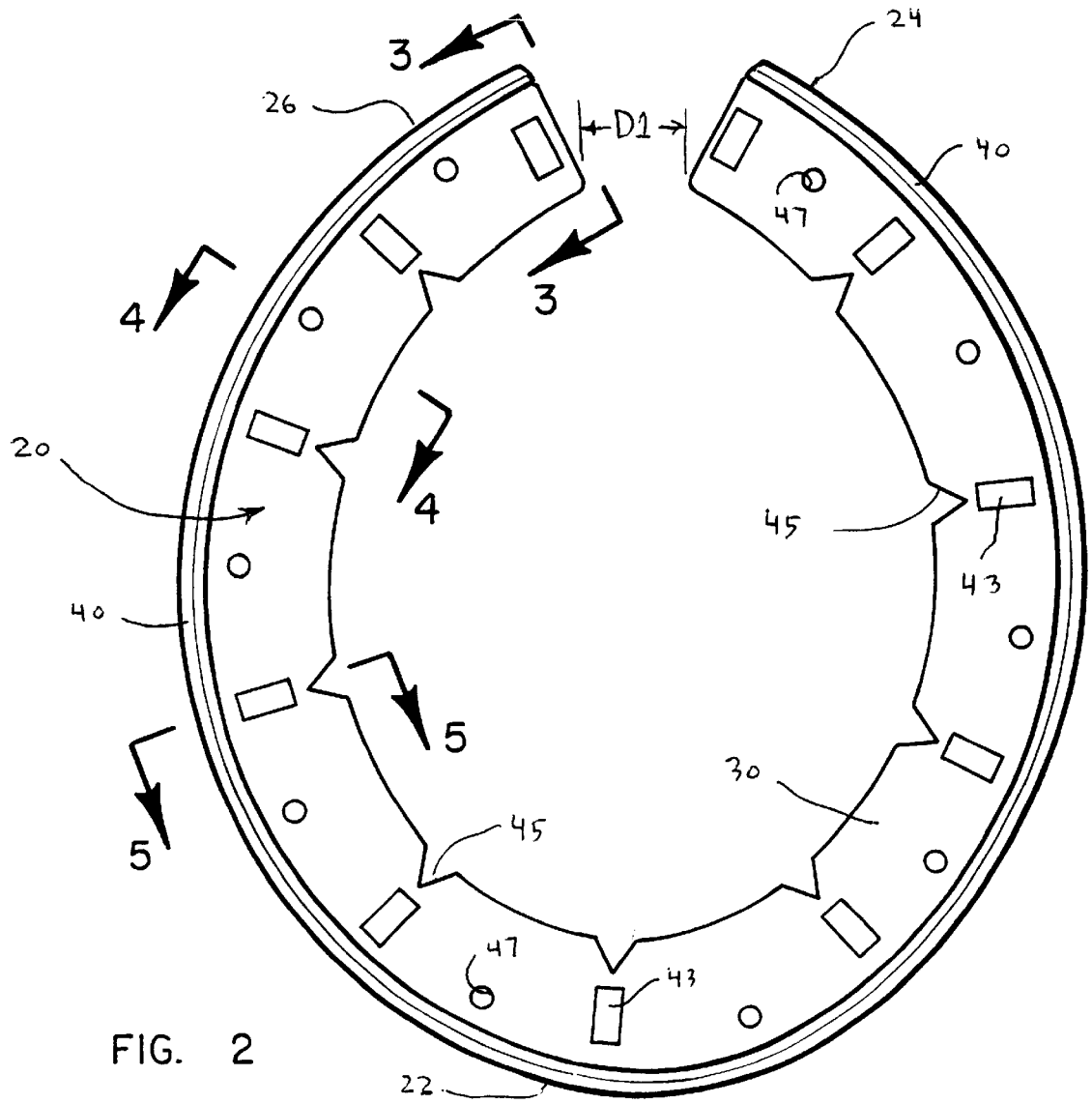
FIG. 2 is a top plan view of a multi-sizable horseshoe showing it in substantially its actual size.

The multi-sizable horseshoes will now be described by referring to FIGS. 1–15 of the drawings. The horseshoe is generally designated numeral 18 and is shown in FIG. 1 in a front perspective view. FIG. 2 is a top plan view of horseshoe 18 in substantially its actual size. FIG. 6 is a bottom plan view of horseshoe 18 in substantially its actual size.

The nature of the structure of horseshoe 18 will be best understood by referring to FIGS. 2–6. Horseshoe 18 has a horseshoe-shaped body member 20 having a front toe portion 22 and a pair of laterally spaced heel members 24 and 26. Body member 20 has an outer edge 28, an inner edge 29, a top surface 30 and a bottom surface 31. Body member 20 is made of a synthetic material such as urethane. Heel members 24 and 26 have a predetermined spacing D1 between each other in their static unstressed state. D1 is in the range of 0.1–2.0 inch.

Outer edge 28 of body member 20 has a downwardly extending outer gripping edge 34. Spaced inwardly from gripping edge 34 is a downwardly extending inner gripping edge or flange 36. A channel 38 is formed between the respective members 34 and 36. An outside rim 40 extends upwardly from outer edge 28 and mates with the sides of a horse's hoof. An upwardly beveled surface 41 is formed along the inner edge of top surface 30. A plurality of protrusions 43 extend upwardly from top surface 30 at spaced intervals to space the bottom surface of a horse's hoof from the top surface of body member 20. Protrusions 43 have a height H1 and H1 is in the range of 1/64–1/8 inch. The space between the top surface 30 of body member 20 and the top surface of protrusions 43 form a chamber between the bottom of a horse's hoof that would be filled by injecting a rapid set glue therein. The glue would travel into this chamber through the bottom of bore holes 47 and the glue would flow over the top surface 30 and fill the chamber. Excess glue would find its way between the inside surface of outside rim 40 and the sides of the horse's hoof. Also additional glue would flow downwardly along beveled inner edge 41 and notches 45 to provide additional locking power between the horseshoe and the bottom surface of a horse's hoof. Notches 45 are formed along the inner edge 41 at spaced intervals. Bore holes 47 pass from top surface 30 to bottom 14 surface 31 and are aligned in channel 38.

An alternative embodiment is racing horseshoe 50 is illustrated in FIG. 7. FIG. 7 only illustrates one half of horseshoe 50 and its other half would be symmetrical. FIG. 7 is a bottom plan view showing a downwardly extending outer gripping edge 52 and the inner gripping edge has been eliminated. The top surface of horseshoe 50 would be identical to that illustrated in FIG. 2. Multi-sizable horseshoe 50 has a horseshoe-shaped body member 54. Body member 54 has an outer edge 56, an inner 57, a top 58 and a bottom surface 59. A plurality of protrusions 62 extend upwardly from top surface 58. A plurality of bore holes 64 extend from top surface 58 to bottom surface 59. Again, the purpose of protrusions 62 is to space the bottom of the horse's hoof from top surface 58 and form a chamber or cavity into which glue is injected through bore holes 64. After the injected glue has filled the chamber, some of it will flow downwardly along beveled inner edge 65 and notches 67. Cross-sectional views 8 and 9 more clearly illustrate the structure previously described.

FIG. 10 is a schematic top plan view of the multi-sizable horseshoe showing the laterally spaced heel members 24 and 26 having a predetermined spacing D1 between each other in their static unstressed state. The horseshoe-shaped body member is made of flexible synthetic material that allows the heel members 24 and 26 to be pulled apart from each other as illustrated in FIG. 11. FIG. 11 is also a schematic illustration of the multi-sizable horseshoe. D2 illustrates the range of distance between the heel members when they have been pulled apart using a modest amount of force that is less than 2 or 3 pounds. D2 is in the range of 1.0–6.0 inches.

FIG. 12 is a schematic cross-sectional view showing the multi-sizable horseshoe 18 mounted on the hoof 19 of a horse. Glue 80 fills the chamber between the bottom surface 81 of hoof 19 and the top surface of horseshoe 18. Glue 80 is also seen to have risen upwardly along the front surface 17 of hoof 19 along the inner surface of outside rim 40.

FIGS. 13 and 14 show a multi-sizable horseshoe 18 mounted on the bottom of the horse's hoof. In FIG. 13, heel members 24 and 26 are seen to extend past the bottom surface of the horse's hoof that is glued to the horseshoe. FIG. 14, shows a farrier tool being used to trim the ends of the heel members back to the proper size of the horse's hoof.

The method in which the multi-sizable horseshoe is applied to the bottom surface of the horse's hoof will now be described. First a drop of instant glue is applied to the top surface of the protrusions 43 on the top surface of the horseshoe-shaped body member 20. Next while the farrier is holding the horse's hoof upwardly, the top surface of the protrusions is applied to the bottom of the horse's hoof. The farrier will hold the horseshoe in place until the instant glue sets up. Next a rapid set glue is injected upwardly through the bore holes 47 into the chamber until it is filled. The excess glue also travels up between the outside surface of the horse's hoof and the inside surface of the inner rim. Additional overflow of the second glue will flow out of the chamber onto the top surface of the body member and along inner edge 41 and the notches 45. The horse's hoof is held in position generally less than 2 or 3 minutes while the second glue sets and forms a permanent bond. After the second glue has formed its permanent bond, the ends of the heel portions of the horseshoe are trimmed or cut to fit the size of the horse's hoof.

A second method of attaching the horseshoe to the bottom surface of the horse's hoof will now be described. A one stage urethane glue can be generously swabbed onto the top surface of the horseshoe and the inner surface of the outside rim and then the horseshoe is attached to the bottom of the horse's hoof. This glue bonds in less than 30 seconds. Then all the outer gaps between the horseshoe and the hoof and between the outside rim and the sides of the horse's hoof is injected with a rapid set urethane glue that cures in about 2 minutes.

FIG. 15 illustrates the manner in which the downwardly extending outer gripping edge can be customized by the use of nippers or other farrier tools. The figure shows gripping teeth 91 in the toe grab, a flat surface 92 and heel grab 93.

What is claimed is:
1. A multi-sizable horseshoe comprising:
   a horse-shoe shaped body member having a front toe portion and a pair of laterally spaced heel members; said horseshoe-shaped body member having an outer edge, an inner edge, a top surface and a bottom surface; said body member being made of a flexible synthetic material and said heel members having a predetermined spacing D1 between each other in there static unstressed state and D1 is in the range of 0.1–2.0 inch; said synthetic material being sufficiently flexible so that said heel members may be spread apart a greater distance D2 by only a slight pulling force thereby enlarging the size of said horseshoe so that it can have multiple size dimensions thereby allowing a single horseshoe to fit all different sizes of horse hoofs and D2 is in the range of 1.0–6.0 inches; and
   said outer edge of said body member having a downwardly extending outer gripping edge at least on said front toe portion.

2. A multi-sizable horseshoe as recited in claim 1 wherein said downwardly extending outer gripping edge extends substantially along the entire length of said outer edge of said body member.

3. A multi-sizable horseshoe as recited in claim 1 wherein said bottom surface of said horseshoe-shaped body member along said inner edge is upwardly beveled.

4. A multi-sizable horseshoe as recited in claim 1 further comprising an outside rim extending upwardly from said outer edge of said horseshoe-shaped body member that mates with the side of a horse's hoof.

5. A multi-sizable horseshoe as recited in claim 1 further comprising a plurality of spaced notches along said inner edge of said horseshoe-shaped body member that function to decrease the force needed to spread said heel members apart when installing said horseshoes on a horse's hoof and also functioning as a cavity that would receive glue and aid in adhering and locking said horseshoe to the bottom surface of a horse's hoof.

6. A multi-sizable horseshoe as recited in claim 1 further comprising a downwardly extending inner gripping edge having a top end that is connected to said bottom surface of said horseshoe-shaped body member; said inner gripping edge being spaced inwardly from said outer gripping edge to form a channel therebetween.

7. A multi-sizable horseshoe as recited in claim 6 further comprising a plurality of bore holes in said channel that extend from said bottom surface of said body member to said top surface of said body member to allow glue to be injected upwardly through said bore holes to fill the space between said top surface of said body member and a bottom surface of a horse's hoof.

8. A multi-sizable horseshoe comprising:
   a horseshoe-shaped body member having a front toe portion and a pair of laterally spaced heel members; said horseshoe-shaped body member having an outer edge, an inner edge, a top surface and a bottom surface; a plurality of protrusions extend upwardly from said top surface of said horseshoe-shaped body member at spaced intervals to space the bottom surface of a horse's hoof from said top surface of said horseshoe-shaped body member, said body member being made of a flexible synthetic material and said heel members having a predetermined spacing D1 between each other in their static unstressed state; said synthetic material being sufficiently flexible so that said heel members may be spread apart a greater distance D2 by only a slight pulling force thereby enlarging the size of said horseshoe so that it can have multiple sized dimensions thereby allowing a single horseshoe to fit all different sizes of horse hoofs; and
   said outer edge of said body member having a downwardly extending outer gripping edge at least on said front toe portion.

9. A multi-sizable horseshoe as recited in claim 8 wherein said protrusions have a height H1 and H1 is in the range of 1/64–1/8 inch.

10. A multi-sizable horseshoe as recited in claim 8 further comprising a plurality of bore holes extending from said bottom surface of said body member to said top surface of said body member to allow glue to be injected upwardly through said bore holes to fill the space between said top surface of said body member and a bottom surface of a horse's hoof.

11. A method for attaching a horseshoe to the bottom surface of a horse's hoof wherein said horseshoe has a horseshoe-shaped body member having an outer edge, an inner edge, a top surface and a bottom surface; said horseshoe-shaped body member having opposed heel portions each having an end, said body member being made of a flexible synthetic material; said body member having a plurality of protrusions extending upwardly from said top surface at spaced intervals to form a chamber between the bottom surface of a horse's hoof and said top surface of said horseshoe-shaped body member; an outside rim extends upwardly from said horseshoe shaped body member and mates with the sides of a horse's hoof; said method comprising the following steps:
   (A) applying a drop of instant glue on said protrusions on said top surface of said horseshoe-shaped body member;
   (B) placing the top surface of said protrusions of said horseshoe against the bottom surface of a horse's hoof and holding it in place until said instant glue sets up which is generally less than 30 seconds;

(C) injecting a second glue into said chamber and filling said chamber between said outer rim, said top surface of said horseshoe-shaped body member and said bottom surface of said horse's hoof.

12. A method as recited in claim 11 wherein said horseshoe has a plurality of bore holes extending from said bottom surface of said body member to said top surface of said body member and instep (C) said second glue is injected upwardly through said bore holes into said chamber between said top surface of said body member and said bottom surface of said horse's hoof and said horse's hoof is held generally less than 3 minutes while said second glue cures and forms a permanent bond.

13. A method as recited in claim 12 further comprising:
(D) trimming ends of the heel portions of said horseshoe to fit the size of said horse's hoof.

* * * * *